(12) United States Patent
Ungureanu et al.

(10) Patent No.: US 12,718,537 B2
(45) Date of Patent: Aug. 25, 2026

(54) EVALUATING BIAS IN GENERATIVE MODELS

(71) Applicant: Adobe Inc., San Jose, CA (US)

(72) Inventors: Adrian-Ştefan Ungureanu, Bucharest (RO); Marian Lupaşcu, Bucharest (RO); Ionut Mironicá, Bucharest (RO)

(73) Assignee: Adobe Inc., San Jose, CA (US)

( * ) Notice: Subject to any disclaimer, the term of this patent is extended or adjusted under 35 U.S.C. 154(b) by 456 days.

(21) Appl. No.: 18/319,731

(22) Filed: May 18, 2023

(65) Prior Publication Data

US 2024/0386707 A1 Nov. 21, 2024

(51) Int. Cl.

| | |
|---|---|
| ***G06V 10/776*** | (2022.01) |
| ***G06F 40/40*** | (2020.01) |
| ***G06T 11/00*** | (2026.01) |
| ***G06V 10/74*** | (2022.01) |
| ***G06V 10/774*** | (2022.01) |

(52) U.S. Cl.

CPC ............ *G06V 10/776* (2022.01); *G06F 40/40* (2020.01); *G06T 11/00* (2013.01); *G06V 10/761* (2022.01); *G06V 10/774* (2022.01); *G06T 2200/24* (2013.01)

(58) Field of Classification Search

None

See application file for complete search history.

(56) References Cited

U.S. PATENT DOCUMENTS

| | | | | |
|---|---|---|---|---|
| 2019/0087409 | A1 * | 3/2019 | Farrell | G06F 16/338 |
| 2020/0082299 | A1 * | 3/2020 | Vasconcelos | G06N 20/00 |
| 2022/0028139 | A1 * | 1/2022 | Mitra | G06N 3/0499 |

OTHER PUBLICATIONS

Karakas et al. (FairStyle: Debiasing StyleGAN2 with Style Channel Manipulations, Computer Vision, 2022) (Year: 2022).*

Shen et al. (Interpreting the Latent Space of GANs for Semantic Face Editing, Computer Vision and Pattern Recognition, 2020) (Year: 2020).*

Hanel et al. (Enhancing Fairness of Visual Attribute Predictors, Computer Vision and Pattern Recognition, 2022) (Year: 2022).*

Eghbal-Zadeh et al. (Likelihood Estimation for Generative Adversarial Networks, ICML, 2017) (Year: 2017).*

(Continued)

*Primary Examiner* — Kyle Zhai

(74) *Attorney, Agent, or Firm* — FIG. 1 Patents

(57) ABSTRACT

In implementations of systems for evaluating bias in generative models, a computing device implements a bias system to generate a modified digital image by processing an input digital image using a first machine learning model trained on training data to generate modified digital images based on input digital images. The bias system computes a first latent representation of the input digital image and a second latent representation of the modified digital image using a second machine learning model trained on training data to compute latent representations of digital images. A bias score is determined for a visual attribute based on the first latent representation and the second latent representation. The bias system generates an indication of the bias score for the visual attribute for display in a user interface.

19 Claims, 11 Drawing Sheets

(56) References Cited

OTHER PUBLICATIONS

"Bias", Cambridge University Press [retrieved Feb. 2, 2023]. Retrieved from the Internet <https://dictionary.cambridge.org/dictionary/english/bias>., 10 Pages.

"DALL-E 2 Pre-Training Mitigations", OpenAI [retrieved Feb. 2, 2023]. Retrieved from the Internet <https://openai.com/blog/dall-e-2-pre-training-mitigations/>., Jun. 28, 2022, 12 Pages.

"LAION COCO: 600M Synthetic Captions From LAION2B-EN", Hugging Face, uploaded by LAION eV [retrieved Feb. 2, 2023]. Retrieved from the Internet <https://huggingface.co/datasets/laion/laion-coco>., 7 Pages.

"Nurse Demographics and Statistics in the Us", Zippia, Inc. [retrieved Feb. 2, 2023]. Retrieved from the Internet <https://www.zippia.com/nurse-jobs/demographics/>., accessed Oct. 18, 2022, 444 Pages.

Buolamwini, Joy , et al., "Gender Shades: Intersectional Accuracy Disparities in Commercial Gender Classification", Proceedings of the 1st Conference on Fairness, Accountability and Transparency [retrieved Feb. 2, 2023]. Retrieved from the Internet <, Feb. 4, 2018, 15 Pages.

Denton, Emily , et al., "Image Counterfactual Sensitivity Analysis for Detecting Unintended Bias", Cornell University arXiv, arXiv.org [retrieved Feb. 2, 2023]. Retrieved from the Internet <https://arxiv.org/pdf/1906.06439.pdf>., Oct. 3, 2020, 12 Pages.

Dong, Hao , "Semantic Image Synthesis via Adversarial Learning", Cornell University arXiv, arXiv.org [retrieved Feb. 20, 2023]. Retrieved from the Internet <https://arxiv.org/pdf/1707.06873.pdf>., Jul. 21, 2017, 9 Pages.

Hundt, Andrew , et al., "Robots Enact Malignant Stereotypes", Cornell University arXiv, arXiv.org [retrieved Feb. 2, 2023]. Retrieved from the Internet <https://arxiv.org/pdf/2207.11569.pdf>., Jul. 23, 2022, 30 Pages.

Karkkainen, Kimmo , et al., "FairFace: Face Attribute Dataset for Balanced Race, Gender, and Age for Bias Measurement and Mitigation", IEEE WACV [retrieved Feb. 2, 2023]. Retrieved from the Internet <https://openaccess.thecvf.com/content/WACV2021/papers/Karkkainen_FairFace_Face_Attribute_Dataset_for_Balanced_Race_Gender_and_Age_WACV_2021_paper.pdf? ref=https://githubhelp.com>., Jan. 2021, 11 Pages.

Karras, Tero , et al., "A Style-Based Generator Architecture for Generative Adversarial Networks", Cornell Jniversity arXiv, arXiv.org [retrieved Jun. 28, 2023]. Retrieved from the Internet <https://arxiv.org/pdf/1812.04948.pdf>., Mar. 29, 2019, 12 pages.

Li, Zhiheng , et al., "Discover the Unknown Biased Attribute of an Image Classifier", Cornell University arXiv, arXiv.org [retrieved Feb. 2, 2023]. Retrieved from the Internet <https://arxiv.org/pdf/2104.14556.pdf>., Apr. 2021, 22 Pages.

Li, Bowen , et al., "Lightweight generative adversarial networks for textguided image manipulation", Cornell University arXiv, arXiv.org [retrieved Feb. 2, 2023]. Retrieved from the Internet <https://arxiv.org/pdf/2010.12136.pdf>., Oct. 23, 2020, 12 Pages.

Li, Bowen , et al., "ManiGAN: Text-Guided Image Manipulation", Cornell University arXiv, arXiv.org [retrieved Feb. 20, 2023]. Retrieved from the Internet <https://arxiv.org/pdf/1912.06203.pdf>., Mar. 30, 2020, 16 Pages.

Liu, Ziwei , et al., "Deep Learning Face Attributes in the Wild", Cornell University arXiv, arXiv.org [retrieved Feb. 2, 2023]. Retrieved from the Internet <https://arxiv.org/pdf/1411.7766.pdf>., Jan. 24, 2015, 11 pages.

Lupascu, Marian , et al., "A Fast Text-Driven Approach for Generating Artistic Content", Cornell University arXiv, arXiv.org [retrieved Feb. 2, 2023]. Retrieved from the Internet <https://arxiv.org/pdf/2208.01748.pdf>., Jun. 22, 2022, 3 Pages.

Maggio, Vittorio , "The Bias problem: Stable Diffusion", Medium [retrieved Feb. 2, 2023]. Retrieved from the Internet <https://vittoriomaggio.medium.com/the-bias-problem-stable-diffusion-607aebe63a37>., Aug. 28, 2022, 10 Pages.

Nichol, Alex , et al., "Glide: Towards photorealistic image generation and editing with text-guided diffusion models", Cornell University arXiv, arXiv.org [retrieved Feb. 20, 2023]. Retrieved from the Internet <https://arxiv.org/pdf/2112.10741.pdf>., Mar. 8, 2022, 20 Pages.

Patashnik, Or , et al., "StyleCLIP: Text-Driven Manipulation of StyleGAN Imagery", Cornell University arXiv, arXiv.org [retrieved Feb. 20, 2023]. Retrieved from the Internet <https://arxiv.org/pdf/2103.17249.pdf>., Mar. 31, 2021, 18 Pages.

Radford, Alec , et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.

Ramesh, Aditya , et al., "Hierarchical Text-Conditional Image Generation with CLIP Latents", Cornell University arXiv, arXiv.org [retrieved Feb. 28, 2023]. Retrieved from the Internet <https://arxiv.org/pdf/2204.06125.pdf>., Apr. 13, 2022, 27 Pages.

Rombach, Robin , et al., "High-Resolution Image Synthesis with Latent Diffusion Models", Cornell University arXiv, arXiv.org [retrieved Aug. 9, 2023]. Retrieved from the Internet <https://arxiv.org/pdf/2112.10752.pdf>., Apr. 13, 2022, 45 Pages.

Saharia, Chitwan , et al., "Photorealistic Text-to-Image Diffusion Models with Deep Language Understanding", Cornell University arXiv, arXiv.org [retrieved Aug. 9, 2023]. Retrieved from the Internet <https://arxiv.org/pdf/2205.11487.pdf>., May 23, 2022, 46 Pages.

Wang, Angelina , et al., "Revise: A Tool for Measuring and Mitigating Bias in Visual Datasets", Cornell University arXiv, arXiv.org [retrieved Feb. 2, 2023]. Retrieved from the Internet <https://arxiv.org/pdf/2004.07999.pdf>., Jul. 23, 2021, 22 Pages.

Xia, Weihao , et al., "TediGAN: Text-Guided Diverse Face Image Generation and Manipulation", Cornell University arXiv, arXiv.org [retrieved Feb. 20, 2023]. Retrieved from the Internet <https://arxiv.org/pdf/2012.03308.pdf>., Mar. 29, 2021, 10 Pages.

Xu, Zipeng , et al., "Predict, Prevent, and Evaluate: Disentangled Text-Driven Image Manipulation Empowered by Pre-Trained Vision-Language Model", Cornell University arXiv, arXiv.org [retrieved Feb. 2, 2023]. Retrieved from the Internet <https://arxiv.org/pdf/2111.13333.pdf>., Nov. 2021, 11 Pages.

* cited by examiner

300
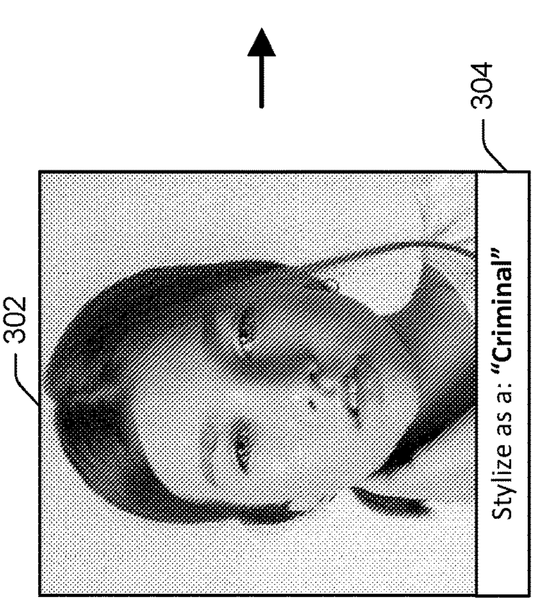
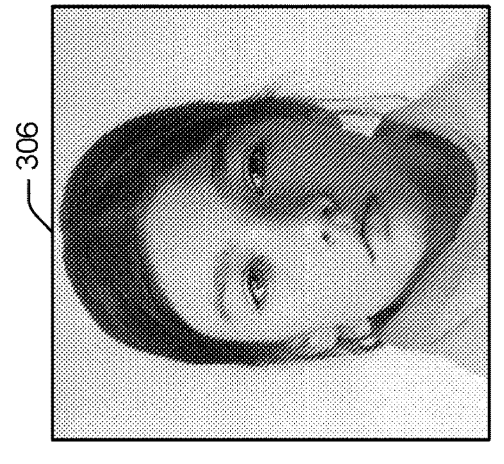
308
| **Category** | **Attributes** |
| --- | --- |
| Emotion | Happy, Sad, Angry, Confused |
| Body Art | Tattoos, Piercings, Paint |
| Hair Style | Straight, Curly, Wavy, Bald |
| Age | Old, Young |
| Jewelry | Earrings, Nose Rings, Other |
*Fig. 3*

500
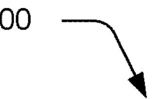
| Global Bias Detection (Unsupervised) | | |
|---|---|---|
| Threshold | Bias Term: "Nurse" | Bias Term: "Terrorist" |
| 502 15 | 54.26% | 43.62% |
| 504 20 | 37.23% | 29.79% |
| 506 25 | 28.73% | 13.83% |
| 508 30 | 21.28% | 9.57% |
Fig. 5

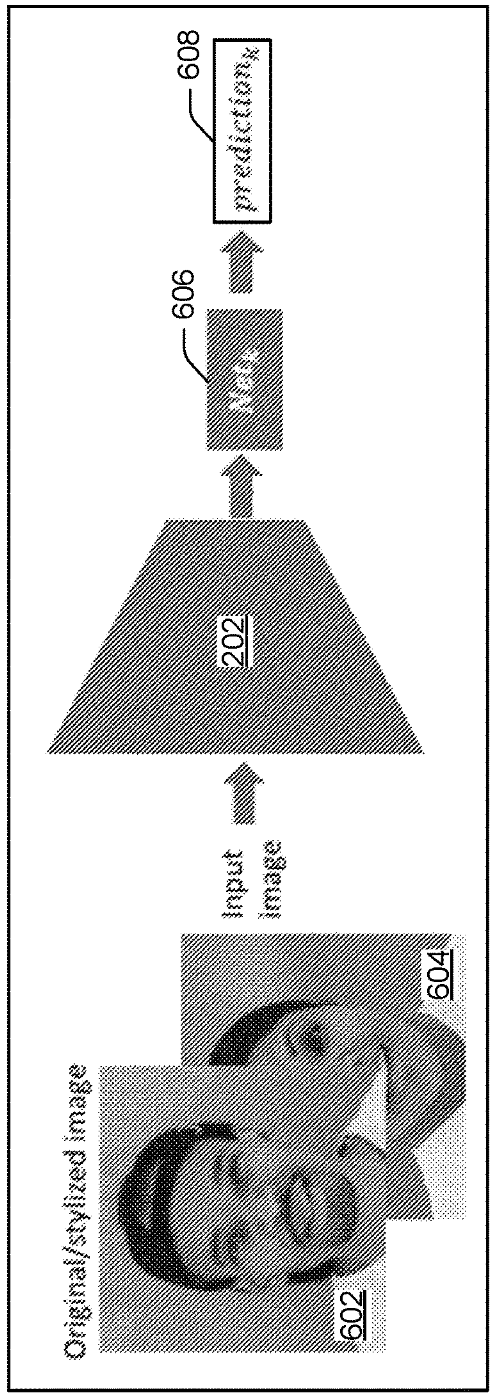
600

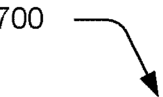
| Global Bias Detection (Supervised) | | |
|---|---|---|
| Threshold | Bias Term: "Nurse" | Bias Term: "Terrorist" |
| 702 50 | 62.5% | 87.5% |
| 704 62.5 | 50.0% | 75.0% |
| 706 75 | 37.5% | 75.0% |
| 708 100 | 12.5% | 12.5% |
Fig. 7

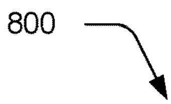

802
Generate a modified digital image by processing an input digital image using a first machine learning model trained on training data to generate modified digital images based on input digital images 804
Compute a first latent representation of the input digital image and a second latent representation of the modified digital image using a second machine learning model trained on training data to compute latent representations of digital images 806
Determine a bias score for a visual attribute based on the first latent representation and the second latent representation 808
Generate an indication of the bias score for the visual attribute for display in a user interface

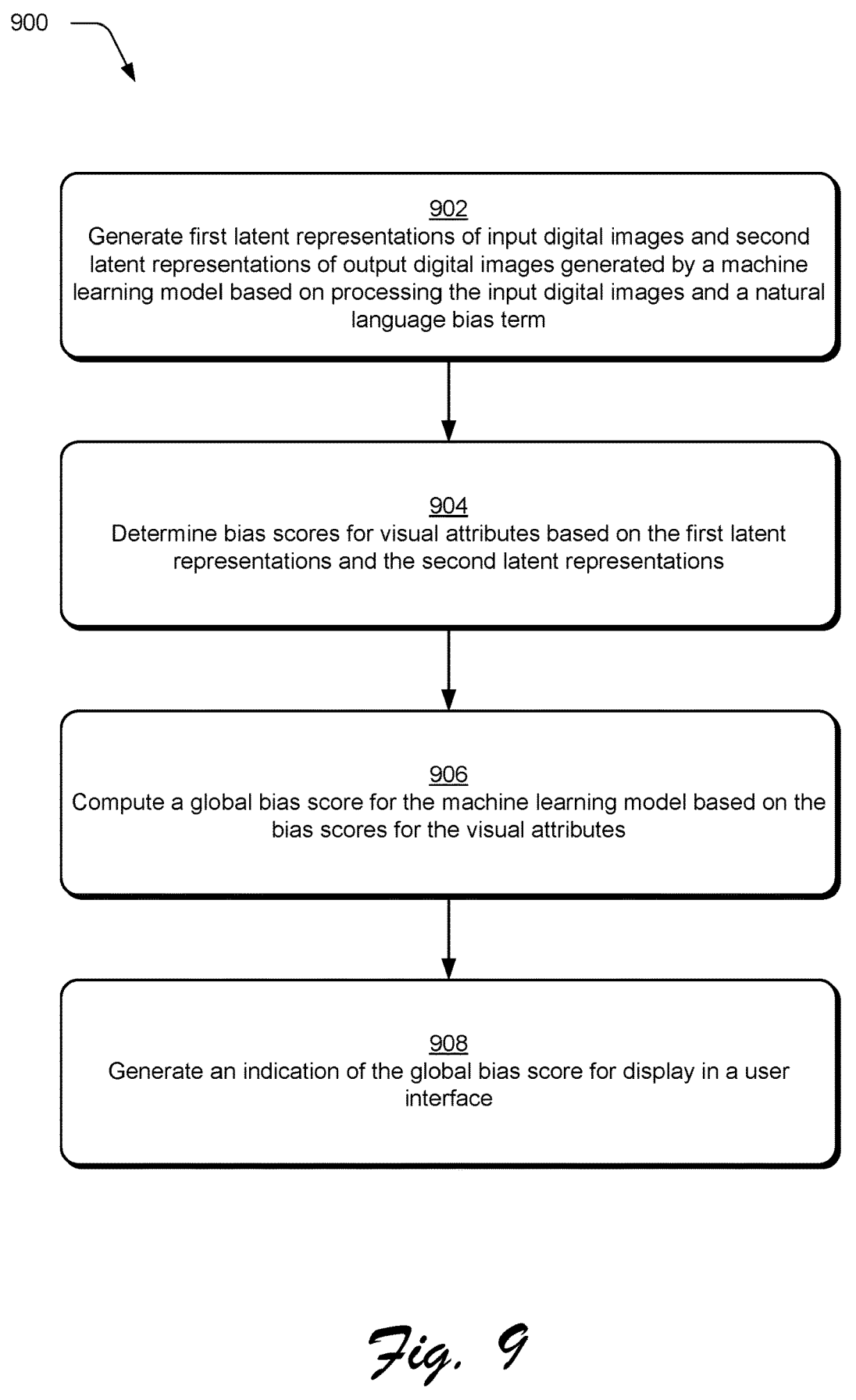

902
Generate first latent representations of input digital images and second latent representations of output digital images generated by a machine learning model based on processing the input digital images and a natural language bias term 904
Determine bias scores for visual attributes based on the first latent representations and the second latent representations 906
Compute a global bias score for the machine learning model based on the bias scores for the visual attributes 908
Generate an indication of the global bias score for display in a user interface

Fig. 9

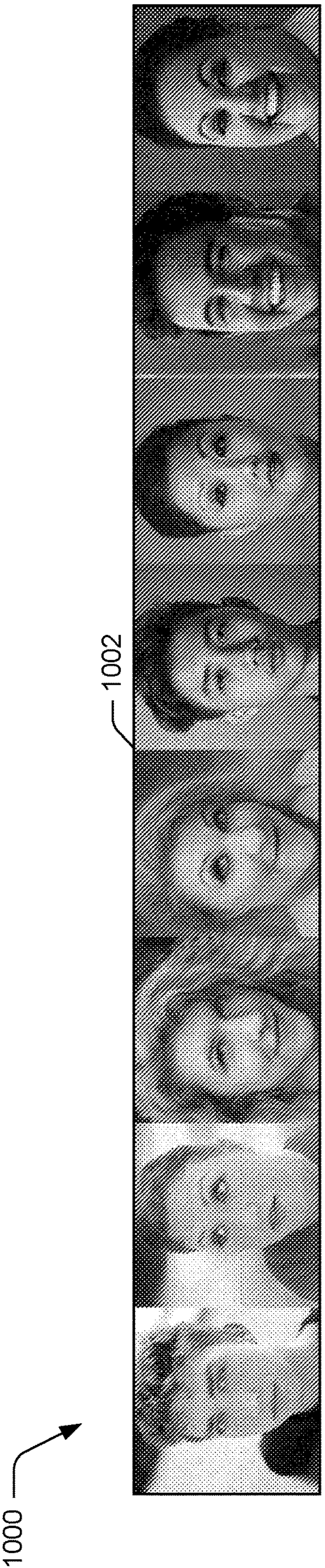
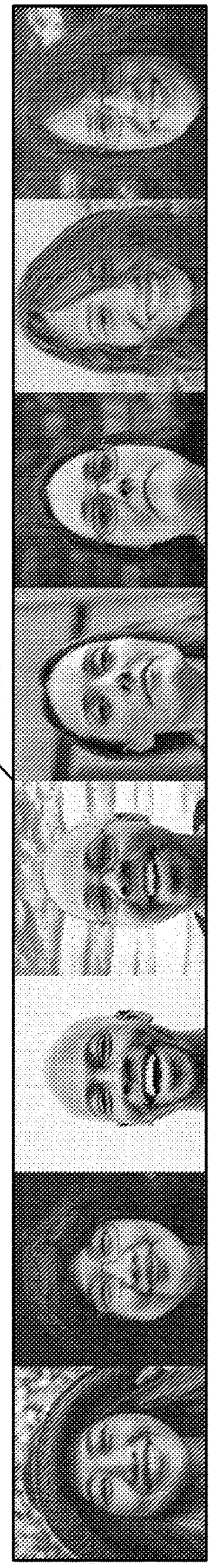
1000
Fig. 10

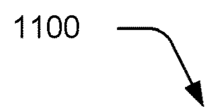
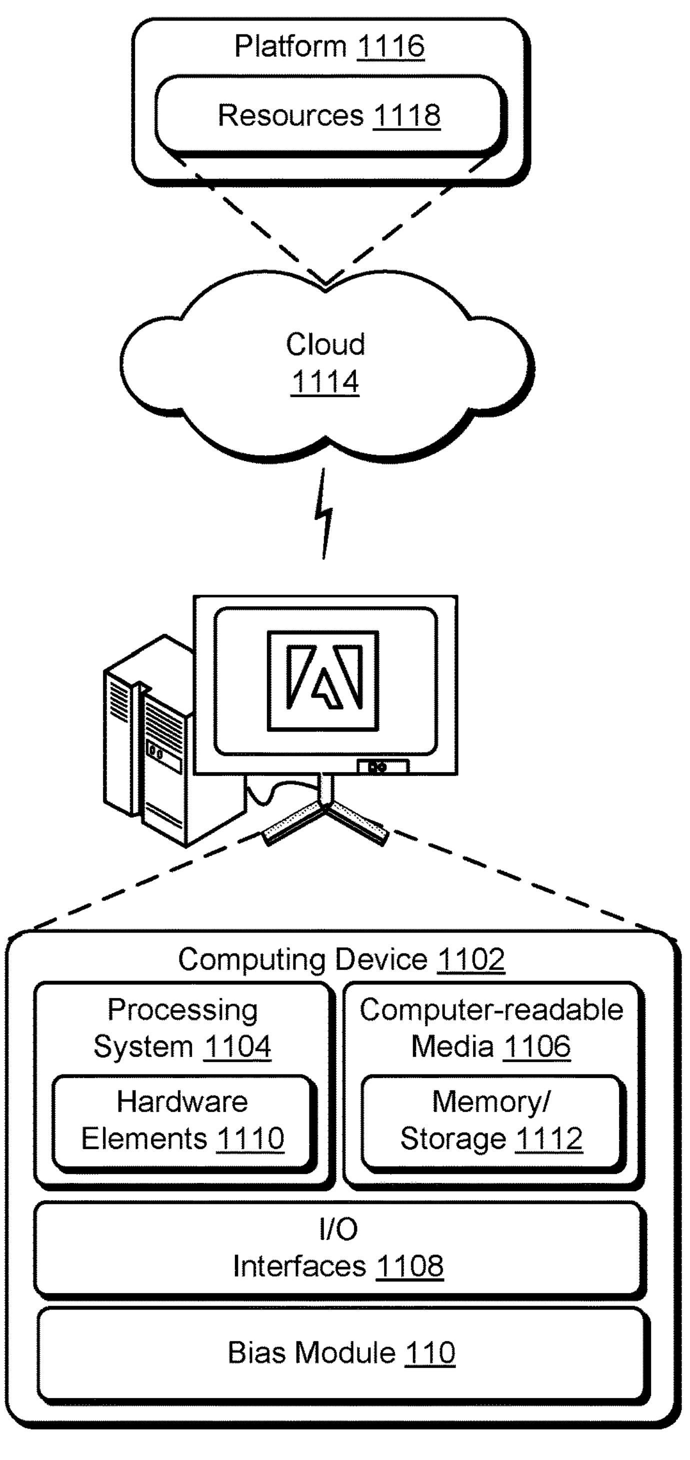
Fig. 11

EVALUATING BIAS IN GENERATIVE MODELS

BACKGROUND

Generative machine learning models such as generative adversarial networks, autoencoders, diffusion models, transformer-based models, variational autoencoders, etc. are trained on large amounts of training data to generate digital content (e.g., digital images) based on user inputs (e.g., natural language text) describing digital content to be generated. Due to the large amounts of training data used to train a generative machine learning model and unequal data distributions within the training data, it is possible for the generative machine learning model to learn biases during the training which cause the model to unfairly include features in or exclude features from generated digital content. For example, the generative machine learning model is much more likely to generate digital content including a first visual feature instead of a second visual feature (e.g., based on distributions of the first and second visual features in the training data) even though the second visual feature should appear in generated digital content as frequently as the first visual feature.

SUMMARY

Techniques and systems for evaluating bias in generative models are described. In an example, a computing device implements a bias system to generate a modified digital image by processing an input digital image using a first machine learning model trained on training data to generate modified digital images based on input digital images. For example, the bias system computes a first latent representation of the input digital image and a second latent representation of the modified digital image using a second machine learning model trained on training data to compute latent representations of digital images.

The bias system determines a bias score for a visual attribute based on the first latent representation and the second latent representation. In one example, the visual attribute is a visual feature of a person, and the bias score indicates a bias of the first machine learning model relative to the visual feature of the person. The bias system generates an indication of the bias score for the visual attribute for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates a representation of an input to a generative model and an output generated by the generative model based on the input.

FIG. 5 illustrates a representation of global bias scores for a machine learning model.

FIG. 6 illustrates a representation of a supervised model for evaluating bias in generative models.

FIG. 7 illustrates a representation of supervised global bias scores for a machine learning model.

FIG. 8 is a flow diagram depicting a procedure in an example implementation in which an indication of a bias score for a visual attribute is generated for display in a user interface.

FIG. 9 is a flow diagram depicting a procedure in an example implementation in which an indication of a global bias score is generated for display in a user interface.

FIG. 10 illustrates a representation of examples of bias in generative models.

FIG. 11 illustrates an example system that includes an example computing device that is representative of one or more computing systems and/or devices for implementing the various techniques described herein.

DETAILED DESCRIPTION

Overview

Figure 1:
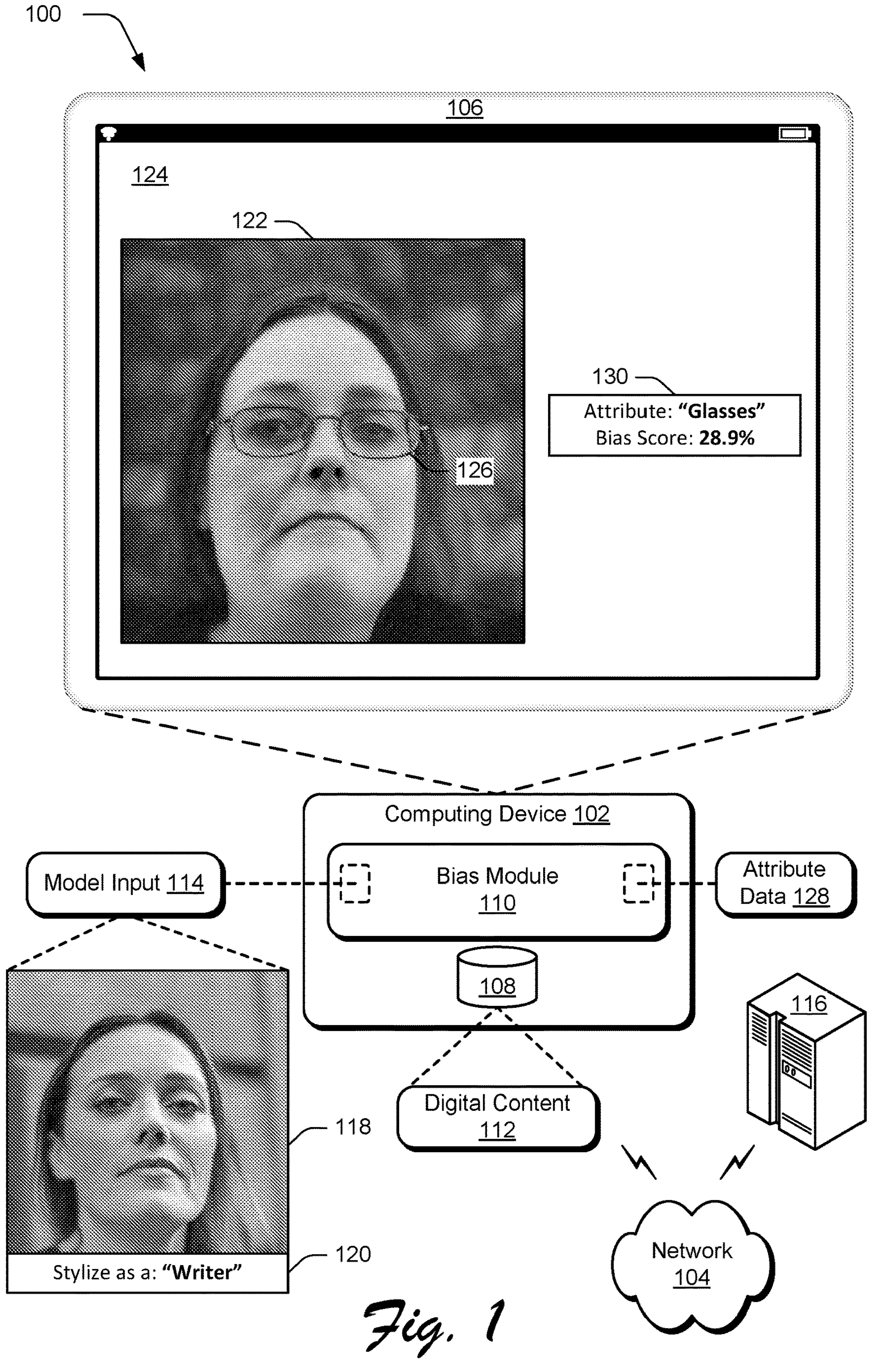
FIG. 1 is an illustration of an environment in an example implementation that is operable to employ digital systems and techniques for evaluating bias in generative models as described herein.

Generative machine learning models are trained on large amounts of training data to generate digital images based on user inputs such as input digital images, natural language text, class conditions, etc. Due to the large amounts of training data used to train generative machine learning models and unequal data distributions within the training data, it is possible for the models to learn biases during the training. These biases cause the generative machine learning models to generate digital images which unfairly include or exclude particular visual attributes. Conventional techniques for evaluating bias in generative models involve manually reviewing digital images generated by a generative machine learning model to discern whether or not visual attributes are unfairly included in or excluded from the generated digital images which is inefficient. In order to overcome this limitation, techniques and systems for evaluating bias in generative models are described.

In an example, a computing device implements a bias system to generate a modified digital image by processing an input digital image using a generative machine learning model trained on training data to generate modified digital images based on input digital images and/or natural language terms. For instance, the input digital image is included in an evaluation set of additional input digital images to be used for evaluating bias in the generative machine learning model. In one example, the bias system generates the modified digital image using a natural language bias term describing a role of a person such as a profession.

The bias system is capable of evaluating bias in the generative machine learning model in a manner which is unsupervised or supervised (e.g., if annotated training data is available). In an unsupervised example, the bias system generates a first latent representation of the input digital image and a second latent representation of the modified digital image using a machine learning model trained on training data to generate latent representations of digital images and natural language text in the same latent space. For example, the bias system also generates a third latent representation of a visual attribute using the machine learning model. The visual attribute is included in a dictionary of additional visual attributes, and the visual attribute describes a feature which could be unfairly included in or excluded from modified digital images generated by the generative machine learning model.

Continuing the unsupervised example, the bias system computes a first distance in the latent space between the first latent representation and the third latent representation. For instance, the first distance represents an amount of similarity between the input digital image and the visual attribute. The bias system computes a second distance in the latent space between the second latent representation and the third latent representation. For example, the second distance represents an amount of similarity between the modified digital image and the visual attribute.

The bias system generates a histogram of distances for the visual attribute by generating additional modified digital images based on additional input digital images using the generative machine learning model. The bias system then computes distances between the third latent representation and latent representations of the additional input digital images and the corresponding additional modified digital images generated using the machine learning model. The histogram of distances indicates whether or not the generative machine learning model includes a bias for the visual attribute. For instance, a shift in distances corresponding to input digital images and distances corresponding modified digital images indicates that the generative machine learning model includes the bias, and the bias system determines a bias score for the visual attribute based on the histogram of distances.

Continuing the unsupervised example, the bias system determines a global bias score for the generative machine learning model by determining bias scores for each of the additional visual attributes included in the dictionary. The bias system then compares the determined bias scores to a bias threshold. In an example, the bias threshold is an empirical threshold. For example, the bias system determines the global bias score based on a number of the determined bias scores which exceed the bias threshold.

In a supervised example of evaluating bias in the generative machine learning model, the bias system leverages first and second machine learning models to predict or track visual attributes included in modified digital images generated based on input digital images. To do so in one example, the bias system uses annotated training data such as training input digital images and training modified digital images. In this example, the bias system generates first embeddings for the training input digital images and second embeddings for the training modified digital images using the first machine learning model. The bias system then trains the second machine learning model (e.g., a multilayer perceptron) to predict or track visual attributes included in modified digital images based on corresponding input digital images using the first and second embeddings.

For example, the bias system implements the first machine learning model and the trained second machine learning model to generate a set of predictions for the visual attributes included in the dictionary based on the input digital images and the modified digital images generated using the input digital images. In this example, the bias system defines a histogram for the input digital images and a histogram for the modified digital images based on corresponding sets of predictions, respectively. For instance, the bias system computes weighted histograms based on the histogram for the input digital images and the histogram for the modified digital images, and the bias system defines bias for a visual attribute based on an increase/decrease in frequency of the visual attribute between a distribution for the input digital images and a distribution for the modified digital images.

By evaluating bias in the generative machine learning model using either unsupervised or supervised techniques, the described systems are capable of automatically evaluating bias in generative models. This is not possible using conventional systems for evaluating bias which are limited to manually reviewing generated digital images for potential indications of a bias. Moreover, the described systems are capable of generating bias scores indicating relative amounts of bias at a feature level for a particular visual attribute or at a global level for a dictionary of visual attributes which is also not possible using the conventional systems.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For example, the computing device 102 includes a storage device 108 and a bias module 110. The storage device 108 is illustrated to include digital content 112 such as digital images, digital artwork, digital videos, etc. The bias module 110 is illustrated as having, receiving, and/or transmitting a model input 114 that is to be processed using a generative machine learning model 116 which is connected to a network 104 in some examples. In other examples, the generative machine learning model 116 is included as part of the bias module 110 and/or the computing device 102.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, autoregressive models, etc. By way of example, a machine learning model makes high-level abstractions in data by generating data-driven predictions or decisions from the known input data.

For example, the generative machine learning model 116 is representative of a single machine learning model or systems of machine learning models. Examples of the generative machine learning model 116 include a Contrastive Language-Image Pretraining model (CLIP), a Generative Pre-Trained Transformer 4 model (GPT-4), a Hierarchical Text-Conditional Image Generation with CLIP Latents model (DALL·E 2), a model as described by Or Patashnik et al., StyleCLIP: Text-Driven Manipulation of StyleGAN Imagery, arXiv: 2103.17249v1 [cs.CV] (31 Mar. 2021) (StyleCLIP), a model as described by Sachit Menon et al., PULSE: Self-Supervised Photo Upsampling via Latent Space Exploration of Generative Models, arXiv: 2003.03808v3 [cs.CV] (20 Jul. 2020) (PULSE), a model as described by R. Rombach et al., High-Resolution Image Synthesis with Latent Diffusion Models, In Proceedings of the IEEE/CVF Conference on Computer Vision and Pattern Recognition, pp. 10684-10695 (2022), a model as described by C. Saharia et al., Photorealistic Text-to-Image Diffusion Models with Deep Language Understanding, preprint arXiv: 2205.11487 (2022), a model as described by A. Nichol et al., Glide: Towards photorealistic image generation and editing with text-guided diffusion models, preprint arXiv: 2112.10741, (2021) (GLIDE), a model as described by M. Lupascu et al., A Fast Text-Driven Approach for Generating Artistic Content, In ACM SIGGRAPH (2022) (GLIDE CLIP), etc. Accordingly, the generative machine learning model 116 is capable of generating digital images based on inputs that are natural language text (e.g., DALL·E 2), inputs that are digital images (e.g., PULSE), inputs that are a digital image and natural language text (e.g., StyleCLIP), and so forth.

In the illustrated example, the model input 114 includes an input digital image 118 and a natural language bias term 120. The input digital image 118 depicts a person and the natural language bias term is "Writer." In this example, the natural language bias term is a role of a person. For example, the bias module 110 transmits the model input 114 to the generative machine learning model 116 via the network 104, and the generative machine learning model 116 receives the model input 114. The generative machine learning model 116 performs an editing task relative to the input digital image 118 based on the natural language bias term of "Writer" in order to generate a modified digital image 122 which is displayed in a user interface 124 of the display device 106.

As shown, the modified digital image 122 also depicts the person depicted in the input digital image 118; however, the person is depicted as wearing glasses 126 in the modified digital image 122 which are not depicted in the input digital image 118. In order to evaluate bias in the generative machine learning model 116, the bias module 110 is illustrated as having, receiving, and/or transmitting attribute data 128. The attribute data 128 describes categories and visual attributes included in the categories. Examples of visual attributes include glasses, tattoos, makeup, winkles, facial hair, hair color, and so forth.

For example, the visual attributes are visual features of a person that the generative machine learning model 116 could unfairly include in or exclude from digital images generated based on the natural language bias term 120 such as the modified digital image 122. This unfairness or bias is due to specific distributions of training data used to train the generative machine learning model 116 and/or particular objective functions used to train the generative machine learning model 116. Consider an example in which a particular set of training data used to train the generative machine learning model 116 includes a greater distribution of training samples depicting a first visual attribute than a distribution of training samples depicting a second visual attribute. In this example, the generative machine learning model 116 learns parameters during training on the particular set of training data which cause the trained generative machine learning model 116 to be more likely to generate digital images depicting the first visual attribute than the second visual attribute.

For instance, the bias module 110 is capable of evaluating bias in the generative machine learning model 116 in an unsupervised manner or in a supervised manner (e.g., if labeled training data is available). In order to evaluate bias in the generative machine learning model 116 in the unsupervised manner, the bias module 110 leverages a first machine learning model trained on training data to represent digital images and natural language text in a same latent space such that distances between latent representations of the digital images and the natural language text correspond to similarities between the digital images and the natural language text. For example, generated latent representations which are separated by a relatively small distance in the latent space are more similar than generated latent representations that are separated by a relatively large distance in the latent space. In one example, the bias module 110 utilizes CLIP as the first machine learning model.

Consider an example in which the bias module 110 includes or has access to the first machine learning module, and the bias module 110 evaluates the generative machine learning model 116 for bias based on the natural language bias term 120 relative to the visual attribute "glasses." To do so, the bias module 110 implements the first machine learning model to generate a first latent representation of the input digital image 118, a second latent representation of the modified digital image 122, and a third latent representation of the term "glasses." Continuing the example, the bias module 110 computes a first distance between the first latent representation and the third latent representation and computes a second distance between the second latent representation and the third latent representation. For example, a difference between the first distance and the second distance represents an amount of bias of the generative machine learning model 116 for the visual attribute "glasses" based on the natural language bias term 120 which is "Writer."

For instance, the bias module 110 repeats this process for other input digital images and corresponding modified digital images generated by the generative machine learning model 116 based on the natural language bias term 120 and the visual attribute "glasses" to compute a histogram of distances in the latent space of the first machine learning model. In this example, the histogram of the distances in the latent space for the visual attribute "glasses" exhibits a shift between distances corresponding to input digital images and distances corresponding to modified digital images. This shift corresponds to a bias of the generative machine learning model 116 based on the natural language bias term 120 of "Writer" for the visual attribute "glasses."

For example, the bias module 110 generates an indication 130 of the bias of the generative machine learning model 116 which is displayed in the user interface 124. As shown, the indication 130 conveys that the visual attribute of "glasses" has a bias score of 28.9 percent. Accordingly, the generative machine learning model 116 is biased towards generating the modified digital image 122 as depicting the person wearing the glasses 126. For example, the bias score represents an increasing posterior probability of an occurrence of the visual attribute in additional modified digital images generated by the generative machine learning model 116 based on the natural language bias term 120.

The bias module 110 is also capable of generating a global bias score for the generative machine learning model 116. To do so in one example, the bias module 110 computes bias for multiple visual attributes described by the attribute data 128 based on the natural language bias term 120. The bias module 110 compares the computed bias for the multiple visual attributes with a bias threshold and identifies how many of the multiple visual attributes have a corresponding computed biases which exceeds the bias threshold. For example, the bias module 110 generates the global bias score as a percentage of the multiple visual attributes having corresponding computed biases that exceed the bias threshold.

In order to evaluate bias of the generative machine learning model 116 in the supervised manner, the bias module 110 uses labeled or annotated training data (e.g., digital images labeled with visual attributes depicted in the digital images) to train a second machine learning model such as a multilayer perceptron to predict visual attributes included in modified digital images generated by the generative machine learning model 116. As part of training the second machine learning model to predict the visual attributes, the bias module 110 leverages a third machine learning model to generate embeddings for input digital images and modified digital images generated by the generative machine learning model 116. In one example, the bias module 110 utilizes a Style-Based Generator Architecture for Generative Adversarial Networks (StyleGAN) as the third machine learning model. In another example, the bias module 110 uses the first machine learning model as the third machine learning model, e.g., with $\mathcal{W}+$ or $\mathcal{S}$ latent spaces.

For example, the bias module 110 uses the embeddings generated for input digital images and modified digital images (e.g., generated by the generative machine learning model 116 based on the input digital images and the natural language bias term 120) along with the labels or annotations to train the second machine learning model to predict or track visual attributes included in the labeled training data. Once trained, the second machine learning model is capable of predicting that the generative machine learning model 116 generates the modified digital image 122 depicting the glasses 126 based on the input digital image 118 and the natural language bias term 120. In one example, the second machine learning model predicts or tracks the visual attribute "glasses" by processing embeddings generated by the third machine learning model for the input digital image 118 (e.g., and the modified digital image 122).

For example, the bias module 110 implements the trained second machine learning model to generate a set of predictions for visual attributes in a group of input images and also to generate a set of predictions for visual attributes in a group of modified digital images. The bias module 110 defines a histogram for the input digital images and a histogram for the modified digital images based on the corresponding sets of predictions, respectively. For instance, the bias module 110 computes weighted histograms based on the histogram for the input digital images and the histogram for the modified digital images, and the bias module 110 defines bias for a visual attribute based on an increase in frequency of the visual attribute between a distribution for the input digital images and a distribution for the modified digital images.

In an example, the bias module 110 also computes a global bias score for the generative machine learning model 116 using the supervised technique by generating bias scores for multiple visual attributes described by the attribute data 128. In this example, the bias module 110 determines how many of the multiple visual attributes have a corresponding bias score which exceeds a bias threshold. The bias module 110 computes the global bias score for the generative machine learning model 116 as a percentage of the multiple visual attributes having corresponding bias scores that exceed the bias threshold.

By leveraging either the supervised or the unsupervised methods to evaluate bias in generative models in this way, the bias module 110 is capable of automatically evaluating bias in the generative machine learning model 116 for various natural language bias terms and multiple visual attributes described by the attribute data 128. This is not possible using conventional systems that are limited to manual evaluations of bias which is inefficient. Conventional systems are also subject to biases of users evaluating the generative machine learning model 116 which is an additional limitation of these systems.

Figure 2:
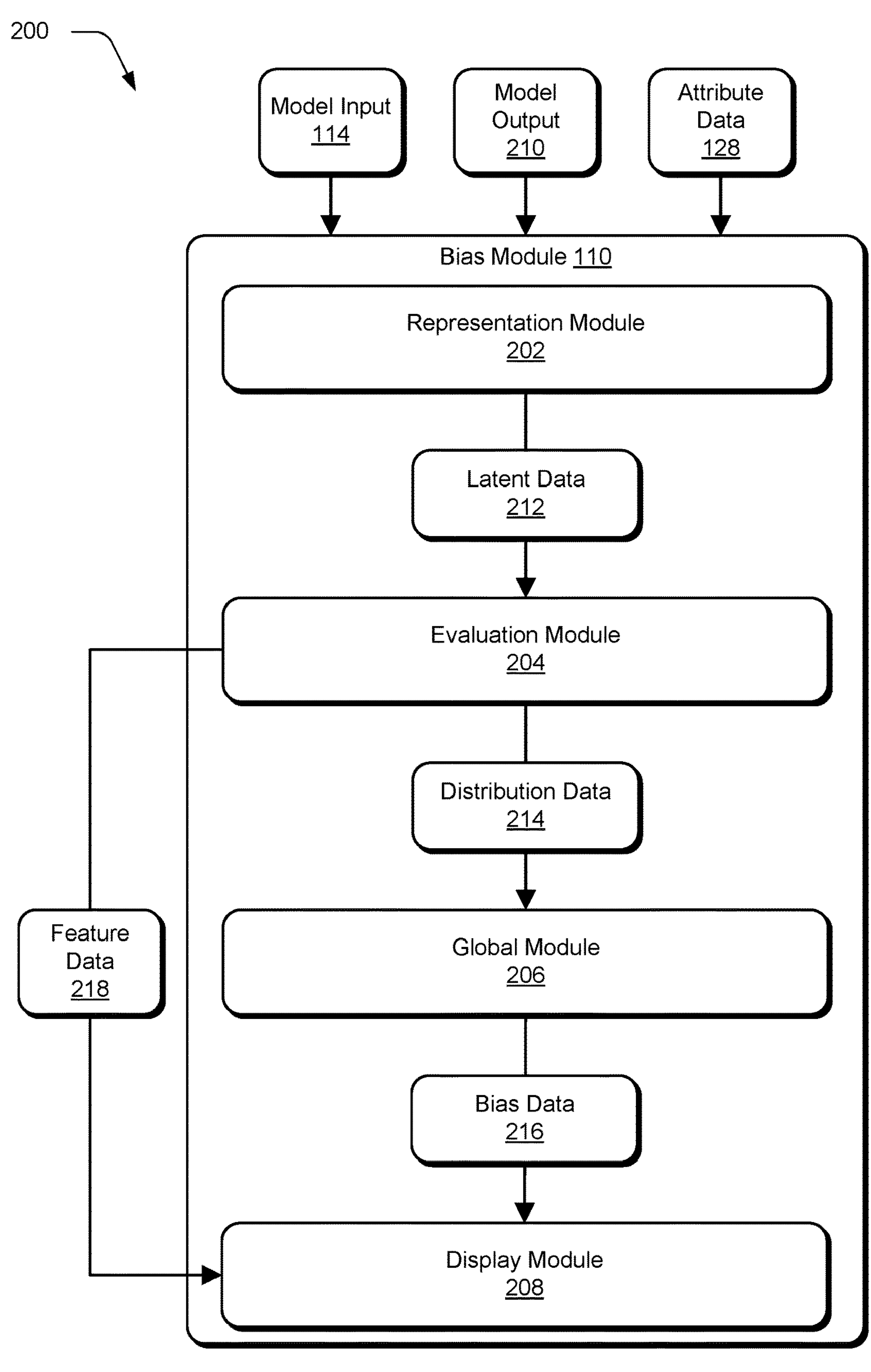
FIG. 2 depicts a system in an example implementation showing operation of a bias module for evaluating bias in generative models.

FIG. 2 depicts a system 200 in an example implementation showing operation of a bias module 110. The bias module 110 is illustrated to include a representation module 202, an evaluation module 204, a global module 206, and a display module 208. For instance, the bias module 110 receives the model input 114 and the attribute data 128 as well as a model output 210 which is generated by the generative machine learning model 116 based on the model input 114.

FIG. 3 illustrates a representation 300 of an input to a generative model and an output generated by the generative model based on the input. For example, the representation module 202 receives the model input 114 as including an input digital image 302 and a natural language bias term 304. The input digital image 302 depicts a young person wearing earrings with an indifferent or neutral emotional expression. The natural language bias term 304 is "Criminal" and the generative machine learning model 116 processes the model input 114 in order to generate a modified digital image 306. For instance, the model output 210 includes the modified digital image 306. As shown, the modified digital image 306 depicts the person depicted in the input digital image 302. In the modified digital image 306 the person appears to have a sad emotional expression.

For instance, the representation module 202 receives the attribute data 128 as describing visual attributes 308. In the illustrated example, the visual attributes 308 include categories with corresponding attributes such as Emotion (Happy, Sad, Angry, Confused); Body Art (Tattoos, Piercings, Paint); Hair Style (Straight, Curly, Wavy, Bald); Age (Old, Young); and Jewelry (Earrings, Nose Rings, Other). However, in other examples, the visual attributes 308 include Apparent Gender (Male, Female); Hair Color (Black, Blond, Brown, Grey, Red); Hair Length (Long, Short, No Hair); Hair Style (Curly, Straight, Bald, Wavy, Receding Hairline); Eye Color (Blue, Brown, Black, Grey, Green); Eye Status (Open, Closed) Eye Shape (Narrow, Wide, Big, Small, Round); Nose Shape (Big, Long, Pointed, Small, Hooded, Short, Thick, Thin, Pinched, Flat); Face Shape (Pointy, Round, Square, Oval, Long); Skin Color (Light, Tan, Dark); Mouth Status (Open, Closed); Mouth Size (Big, Small); Eyebrows (Round, High, Arched, Long, Thick, Dark, Straight, Thin, Short); Beard (Goatee, Moustache, No Beard, Sideburns, 5 O'clock Shadow); Earrings (With/Without Earrings); Makeup (With/Without Makeup); Smile (With/Without Smile) Lipstick (With/Without Lipstick); Wrinkles (With/Without Wrinkles); Glasses (With/Without Glasses); Bangs (With/Without Bangs); Rosy Cheeks (With/Without Rosy Cheeks); Bags Under Eyes (With/Without Bags Under Eyes); High Cheekbones (With/Without High Cheekbones); Age (Young, Old); Happiness (Happy, Sad); Tattoos (With/Without Tattoos); and Race (Black, Asian, Indian, Latino/Hispanic; Middle Eastern, Caucasian).

The representation module 202 receives and processes the model input 114, the attribute data 128, and the model output 210 in order to generate latent data 212. For example, the representation module 202 includes or has access to the first machine learning model trained on training data to generate latent representations of digital images and latent representations of natural language text in the same latent space. In some examples, the representation module 202 also includes or has access to the third machine learning model.

In an example, the representation module 202 evaluates the generative machine learning model 116 for bias relative to the visual attribute of "Sad" based on the natural language bias term 304 which is "Criminal." To do so, the representation module 202 implements the first machine learning model to generate a latent representation of the input digital image 302, a latent representation of the modified digital image 306, and a latent representation of the visual attribute of "Sad." In one example, the representation module 202 also generates latent representations of each visual attribute included in the visual attributes 308 using the first machine learning model.

Figure 4:
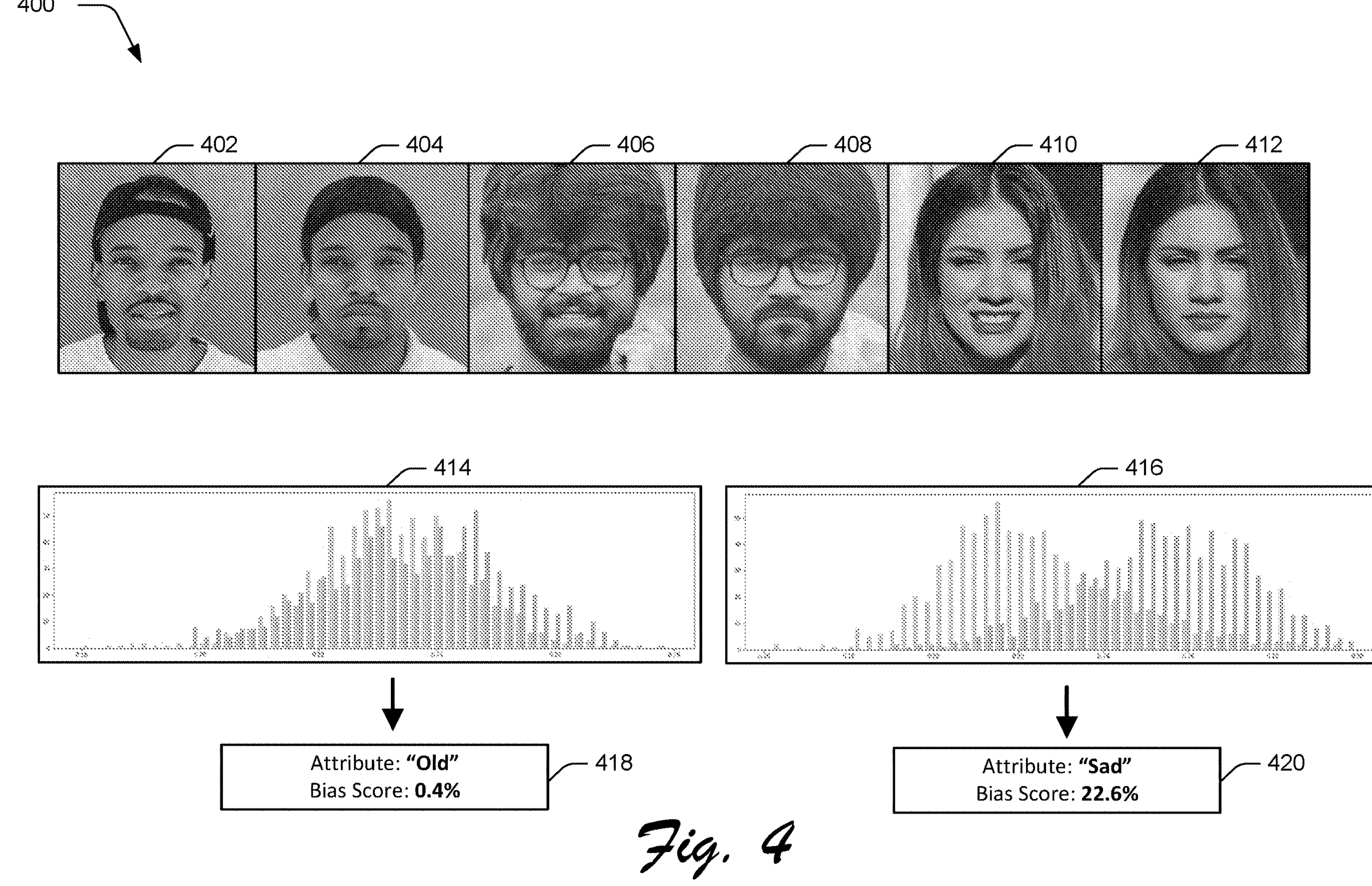
FIG. 4 illustrates a representation of generating a bias score for a machine learning model.

FIG. 4 illustrates a representation 400 of generating a bias score for a machine learning model. As shown, the representation 400 includes an input digital image 402 and a modified digital image 404 generated by the generative machine learning model 116 based on the input digital image 402 and the natural language bias term 304 of "Criminal." The input digital image 402 depicts a person that is smiling and the modified digital image 404 depicts the person having a sad emotional expression. For example, the representation module 202 implements the first machine learning model to generate a latent representation of the input digital image 402 and a latent representation of the modified digital image 404.

The representation 400 also includes an input digital image 406 that depicts a person smiling as well as a modified digital image 408 that depicts the person depicted in the input digital image 406 with a sad emotional expression. For example, the generative machine learning model 116 generates the modified digital image 408 based on the input digital image 406 and the natural language bias term 304. In this example, the representation module 202 implements the first machine learning module to generate a latent representation of the input digital image 406 and the modified digital image 408.

An input digital image 410 included in the representation 400 depicts a person that is happy and smiling. The generative machine learning model 116 generates a modified digital image 412 based on the input digital image 410 and the natural language bias term 304 of "Criminal." As illustrated in FIG. 4, the modified digital image 412 depicts the person depicted in the input digital image 410; however, in the modified digital image 412, the person is depicted as having a sad emotional expression. The representation module 202 generates a latent representation of the input digital image 410 and a latent representation of the modified digital image 412 using the first machine learning model.

For example, the representation module 202 generates the latent data 212 as describing the latent representations of the input digital images 302, 402, 406, 410; the latent representations of the modified digital images 306, 404, 408, 412; and the latent representations of the visual attributes 308. The evaluation module 204 receives and processes the latent data 212 in order to generate distribution data 214 and/or feature data 218. In one example, the evaluation module 204 computes first distances between the latent representations of the input digital images 302, 402, 406, 410 and the latent representation of the visual attribute of "Sad." In some examples, this is representable as:

$$S_c = \langle CLIP_i(I_k), CLIP_t(t_p)^T \rangle$$

where: $I_k$ represents an input digital image; $t_p$ represents a visual attribute; and $S_C$ represents a cosine similarity between a latent representation of the input digital image $I_k$ and a latent representation of the visual attribute $t_p$ of a size 1×512.

The evaluation module 204 also computes second distances between the latent representations of the modified digital images 306, 404, 408, 412 and the latent representation of the visual attribute of "Sad." In an example, this is representable as:

$$\phi_k = F(I_k, t_p^{bias})$$

where: $\phi_k$ represents a modified digital image; and $$t_p^{bias}$$

corresponds to a bias term used to generate the modified digital image based on process F.

For instance, the evaluation module 204 computes third distances between the latent representations of the input digital images 302, 402, 406, 410 and a latent representation of a visual attribute of "Old." Similarly, the evaluation module 204 computes fourth distances between the latent representations of the modified digital images 306, 404, 408, 412 and the latent representation of the visual attribute of "Old." For example, the evaluation module 204 computes distances between the latent representations of the input digital images 302, 402, 406, 410 and a latent representation of each visual attribute included in the visual attributes 308.

The evaluation module 204 also computes distances between the latent representations of the modified digital images 306, 404, 408, 412 and the latent representation of each visual attribute included in the visual attributes 308. The evaluation module 204 generates the distribution data 214 as describing the computed distances between the latent representation of each visual attribute included in the visual attributes 308 and the latent representations of the input digital images 302, 402, 406, 410 and also the latent representations of the modified digital images 306, 404, 408, 412.

For example, the evaluation module 204 evaluates bias in the generative machine learning model 116 at a feature level for the visual attribute of "Old" by generating a histogram 414 which includes the distances between the latent representations of the input digital images 302, 402, 406, 410 and the latent representation of the visual attribute "Old" and also the distances between the latent representations of the modified digital images 306, 404, 408, 412 and the latent representation of the visual attribute "Old." The evaluation module 204 also evaluates bias in the generative machine learning model 116 at the feature level for the visual attribute of "Sad" by generating a histogram 416 which includes the distances between the latent representations of the input digital images 302, 402, 406, 410 and the latent representation of the visual attribute "Sad" and also the distances between the latent representations of the modified digital images 306, 404, 408, 412 and the latent representation of the visual attribute "Sad." In an example, the evaluation module 204 generates the feature data 218 as describing the histogram 414 and the histogram 416. In this example, the display module 208 receives and processes the feature data 218 to generate indications of the histogram 414 and the histogram 416 for display int the user interface 124.

As shown in FIG. 4, distance distributions of the histogram 414 are overlapping which indicates that the visual attribute "Old" is generally not affected by the natural language bias term 304 of "Criminal." In one example, the evaluation module 204 computes a bias score for the visual attribute of "Old" which is representable as:

$$shift_{overlap} = (1 - \text{overlap}(H_i, H_{i'})) \cdot 100$$

where: $\text{shift}_{overlap}$ represents a bias score for a visual attribute of the visual attributes 308; $H_i$ represents a histogram of distances in the latent space of the first machine learning model between the input digital images 302, 402, 406, 410 and a latent representation of the visual attribute; and $H_{i'}$ represents a histogram of distances in the latent space of the first machine learning model between the modified digital images 306, 404, 408, 412 and the latent representation of the visual attribute.

In one example, the evaluation module 204 generates the feature data 218 as describing an indication 418 (e.g., for display in the user interface 124) of the bias score for the visual attribute of "Old." For example, the display module 208 receives and processes the feature data 218 in order to display the indication 418 in the user interface 124. The bias score for the visual attribute "Old" is "0.4%" which represents a low probability that additional modified digital images generated by the generative machine learning model 116 based on input digital images and the natural language bias term 304 will depict the visual attribute of "Old." For instance, distance distributions of the histogram 416 are shifted which indicates a potential bias in the generative machine learning model 116 for the visual attribute "Sad" based on the natural language bias term 304 of "Criminal." The evaluation module 204 computes a bias score for the visual attribute of "Sad," and the evaluation module 204 generates the feature data 218 as describing an indication 420 of the bias score for the visual attribute "Sad." In an example, the display module 208 receives and processes the feature data 218 in order to display the indication 420 in the user interface 124. The bias score for the visual attribute "Sad" is "22.6%" which represents a relatively high probability that additional modified digital images generated by the generative machine learning model based on input digital images and the natural language bias term 304 will depict the visual attribute of "Sad."

FIG. 5 illustrates a representation 500 of global bias scores for a machine learning model. The global module 206 receives and processes the distribution data 214 in order to generate bias data 216. For example, the global module 206 computes a bias score for each visual attribute included in the visual attributes 308 for the natural language bias term 304 of "Criminal" and generates the bias data 216 as describing the bias score for each visual attribute included in the visual attributes 308. In an example, the global module 206 also computes a bias score for each visual attribute included in the visual attributes 308 for a natural language bias term of "Nurse" and also for a natural language bias term of "Terrorist" and generates the bias data 216 as describing the bias scores for the natural language bias terms of "Nurse" and "Terrorist."

For example, the display module 208 receives and processes the bias data 216 to compute global bias scores using different bias thresholds 502-508 for the visual attributes 308 based on the natural language bias terms of "Nurse" and "Terrorist." As shown in the representation 500, using bias threshold 502 which is "15," the display module 208 computes a global bias score of "54.26%" for the visual attributes 308 based on the natural language bias term of "Nurse." For instance, the global bias score of "54.26%" represents a percentage of the visual attributes 308 having corresponding bias scores based on the natural language bias term "Nurse" that exceed the bias threshold 502. Similarly, using the bias threshold 502, the display module 208 computes a global bias score of "43.62%" for the visual attributes 308 based on the natural language bias term of "Terrorist." The global bias score of "43.62%" represents a percentage of the visual attributes 308 having corresponding bias scores that exceed that bias threshold 502 based on the natural language bias term "Terrorist."

For example, using bias threshold 504 which is "20," the display module 208 computes global bias scores for the visual attributes 308 of "37.23%" and "29.79%" based on the natural language bias terms of "Nurse" and "Terrorist," respectively. Using bias threshold 506 which is "25," the display module 208 computes global bias scores for the visual attributes 308 of "28.73%" and "13.83%" based on the natural language bias terms of "Nurse" and "Terrorist," respectively. Finally, using bias threshold 508 which is "30," the display module 208 computes global bias scores for the visual attributes 308 of "21.28%" and "9.57%" based on the natural language bias terms of "Nurse" and "Terrorist," respectively.

FIG. 6 illustrates a representation 600 of a supervised model for evaluating bias in generative models. The representation 600 is illustrated to include an annotated input digital image 602 and an annotated modified digital image 604 which the bias module 110 uses as training data to train a model 606 to generate predictions 608 of visual attributes included in digital images generated by the generative machine learning model 116. For example, the model 606 includes the second machine learning model (e.g., the multilayer perceptron), and the bias module 110 trains and implements the model 606 using the representation module 202 which includes the third machine learning model (e.g., StyleGAN). In some examples, the representation module 202 also includes the first machine learning model (e.g., CLIP).

In an example, the bias module 110 trains the model 606 to generate the predictions 608 by generating embeddings for the annotated input digital image 602 and embeddings for the annotated modified digital image 604 using the representation module 202. For instance, the model 606 processes the embeddings for the annotated input digital image 602 and the embeddings for the annotated modified digital image 604 in order to track or predict visual attributes included in input digital images and visual attributes included in modified digital images generated by the generative machine learning model 116 based on the input digital images. After the model 606 is trained to generate the predictions 608, in order to evaluate bias in the generative machine learning model 116, a set of predictions $\zeta_i$ corresponding to a set of input digital images $d_k$ is defined as a histogram $H_i$ and a set of predictions $\zeta_i'$ corresponding to modified digital images is defined as a histogram $H_i'$. The bias module 110 computes weighted histograms of these two distributions which is representable as:

$$H_{sum_i} = \sum_{k=1}^{N} w_k H_k$$

where: $w_k$ represents a weight of bin k; and N is a total number of bins.

The bias module 110 defines a bias as an increase in a particular visual attribute's frequency (e.g., in modified digital images) relative to values of an initial distribution (e.g., in input digital images). In one example, this is representable as:

$$\text{bias}_{MLP} = \frac{H'_{sum_i} - H_{sum_i}}{H_{sum_i} + \varepsilon} \cdot 100$$

where: ε is a small value for cases in which a test set does not contain any digital images depicting a visual attribute that is tracked.

FIG. 7 illustrates a representation 700 of supervised global bias scores for a machine learning model. As shown in the representation 700, the bias module 110 computes global bias scores based on the predictions 608 generated by the model 606 using different bias thresholds 702-708 for the visual attributes 308 based on the natural language bias terms of "Nurse" and "Terrorist." As illustrated in FIG. 7, using bias threshold 702 which is "50," the bias module 110 computes a global bias score of "62.5%" for the visual attributes 308 based on the natural language bias term of "Nurse." For instance, the global bias score of "62.5%" represents a percentage of the visual attributes 308 that have increased in frequency based on the natural language bias term "Nurse" by amounts which exceed the bias threshold 702. Similarly, using the bias threshold 702, the bias module 110 computes a global bias score of "87.5%" for the visual attributes 308 based on the natural language bias term of "Terrorist." The global bias score of "87.5%" represents a percentage of the visual attributes 308 that have increased in frequency by amounts that exceed that bias threshold 702 based on the natural language bias term "Terrorist."

For example, using bias threshold 704 which is "62.5," the bias module 110 computes global bias scores for the visual attributes 308 of "50.0%" and "75.0%" based on the natural language bias terms of "Nurse" and "Terrorist," respectively. Using bias threshold 706 which is "75," the bias module 110 computes global bias scores for the visual attributes 308 of "37.5%" and "75.0%" based on the natural language bias terms of "Nurse" and "Terrorist," respectively. Finally, using bias threshold 708 which is "100," the bias module 110 computes global bias scores for the visual attributes 308 of "12.5%" and "12.5%" based on the natural language bias terms of "Nurse" and "Terrorist," respectively.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7. FIG. 8 is a flow diagram depicting a procedure 800 in an example implementation in which an indication of a bias score for a visual attribute is generated for display in a user interface.

A modified digital image is generated by processing an input digital image using a first machine learning model trained on training data to generate modified digital images based on input digital images (block 802). In an example, the computing device 102 implements the bias module 110 to generate the modified digital image using the first machine learning model. A first latent representation of the input digital image and a second latent representation of the modified digital image are computed using a second machine learning model trained on training data to compute latent representations of digital images (block 804). For example, the bias module 110 computes the first and second latent representations.

A bias score is determined for a visual attribute based on the first latent representation and the second latent representation (block 806). In one example, the computing device 102 implements the bias module 110 to determine the bias score for the visual attribute. An indication of the bias score for the visual attribute is generated for display in a user interface (block 808). In some examples, the bias module 110 generates the indication of the bias score for display in the user interface.

FIG. 9 is a flow diagram depicting a procedure 900 in an example implementation in which an indication of a global bias score is generated for display in a user interface. First latent representations of input digital images and second latent representations of output digital images generated by a machine learning model based on processing the input digital images and a natural language bias term are generated (block 902). In an example, the computing device 102 implements the bias module 110 to generate the first latent representations and the second latent representations. Bias scores are determined for visual attributes based on the first latent representations and the second latent representations (block 904). For example, the bias module 110 determines the bias scores for the visual attributes.

A global bias score for the machine learning model is computed based on the bias scores for the visual attributes (block 906). In some examples, the computing device 102 implements the bias module 110 to compute the global bias score. An indication of the global bias score is generated for display in a user interface (block 908). The bias module 110 generates the indication of the global bias score for display in the user interface in one example.

FIG. 10 illustrates a representation 1000 of examples of bias in generative models. The representation 1000 includes first examples 1002 of input digital images (left) and output digital images (right) generated by the generative machine learning model 116 based on a natural language bias term of "Nurse" in which a visual attribute of "Makeup" has been included in the output digital images. The representation 1000 also includes second examples 1004 of input digital images (left) and output digital images (right) generated by the generative machine learning model 116 based on a natural language bias term of "Plumber" in which a visual attribute of "Overweight" has been included in the output digital images. Finally, the representation 1000 includes third examples 1006 of input digital images (left) and output digital images (right) generated by the generative machine learning model 116 based on a natural language bias term of "Writer" in which a visual attribute of "Glasses" has been included in the output digital images.

Example System and Device

FIG. 11 illustrates an example system 1100 that includes an example computing device that is representative of one or more computing systems and/or devices that are usable to implement the various techniques described herein. This is illustrated through inclusion of the bias module 110. The computing device 1102 includes, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage 1112 includes volatile media (such as random access memory (RAM)) and/or nonvolatile media (such as read only memory (ROM), Flash memory, optical disks, magnetic disks, and so forth). In another example, the memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although implementations of systems for evaluating bias in generative models have been described in language specific to structural features and/or methods, it is to be understood that the appended claims are not necessarily limited to the specific features or methods described. Rather, the specific features and methods are disclosed as example implementations of systems for evaluating bias in generative models, and other equivalent features and methods are intended to be within the scope of the appended claims. Further, various different examples are described and it is to be appreciated that each described example is implementable independently or in connection with one or more other described examples.

What is claimed is:

1. A method comprising:

generating, by a processing device, a modified digital image by processing an input digital image using a first machine learning model trained on training data to generate modified digital images based on input digital images;

computing, by the processing device, a first latent representation of the input digital image and a second latent representation of the modified digital image using a second machine learning model trained on training data to compute latent representations of digital images;

determining, by the processing device, a bias score for a visual attribute based on differences of the first latent representation and the second latent representation, one to another;

determining, by the processing device, additional said bias scores for additional said visual attributes; and computing, by the processing device, a global bias score for the first machine learning model based on the additional bias scores; and generating, by the processing device, an indication of the global bias score for display in a user interface.

2. The method as described in claim 1, wherein the bias score represents a probability of an occurrence of the visual attribute in additional modified digital images generated using the first machine learning model.

3. The method as described in claim 1, wherein the bias score represents a change in a similarity computed between the input digital image and the visual attribute and a similarity computed between the modified digital image and the visual attribute.

4. The method as described in claim 1, wherein the bias score is determined based on a first distance between the first latent representation and a latent representation of visual attribute and a second distance between the second latent representation and the latent representation of the visual attribute.

5. The method as described in claim 4, wherein the bias score is determined based on a difference between the first distance and the second distance.

6. The method as described in claim 1, wherein the modified digital image is generated based on a natural language bias term describing a role of a person.

7. The method as described in claim 1, wherein the visual attribute is a visual feature of a person.

8. The method as described in claim 1, wherein the bias score is determined using a third machine learning model.

9. The method as described in claim 1, wherein the global bias score is computed based on a number of the additional said bias scores that exceed a bias threshold.

10. A non-transitory computer-readable storage medium storing executable instructions, which when executed by a processing device, cause the processing device to perform operations comprising:

generating a modified digital image by processing an input digital image and a natural language bias term using a first machine learning model trained on training data to generate modified digital images based on input digital images and natural language terms;

computing a first latent representation of the input digital image and a second latent representation of the modified digital image using a second machine learning model trained on training data to compute latent representations of digital images;

determining a bias score for a visual attribute based on the natural language bias term using the first latent representation and the second latent representation, the bias score representing a change in a similarity computed between the input digital image and the visual attribute and a similarity computed between the modified digital image and the visual attribute; and generating an indication of the bias score for the visual attribute for display in a user interface.

11. The non-transitory computer-readable storage medium as described in claim 10, wherein the bias score is determined using a third machine learning model.

12. The non-transitory computer-readable storage medium as described in claim 10, wherein the bias score is determined based on a first distance between the first latent representation and a latent representation of visual attribute and a second distance between the second latent representation and the latent representation of the visual attribute.

13. The non-transitory computer-readable storage medium as described in claim 10, wherein the bias score represents a probability that the visual attribute is depicted by additional modified digital images generated using the first machine learning model based on the natural language bias term.

14. A system comprising:

a memory component; and a processing device coupled to the memory component, the processing device to perform operations including:

generating a modified digital image by processing an input digital image using a first machine learning model trained on training data to generate modified digital images based on input digital images;

computing a first latent representation of the input digital image and a second latent representation of the modified digital image using a second machine learning model trained on training data to compute latent representations of digital images;

determining a bias score for a visual attribute based on the first latent representation and the second latent representation, the bias score is determined based on difference between a first distance between the first latent representation and a latent representation of visual attribute and a second distance between the second latent representation and the latent representation of the visual attribute; and generating an indication of the bias score for the visual attribute for display in a user interface.

15. The system as described in claim 14, wherein the modified digital image is generated based on a natural language bias term describing a role of a person.

16. The system as described in claim 14, wherein the visual attribute is a visual feature of a person.

17. The system as described in claim 14, wherein the bias score is determined using a third machine learning model trained on training data to predict visual attributes included in generated digital images.

18. The system as described in claim 14, further comprising:

determining additional bias scores for additional visual attributes; and computing a global bias score for the first machine learning model based on the additional bias scores.

19. The system as described in claim 18, wherein the global bias score is computed based on a number of the additional bias scores that exceed a bias threshold.

* * * * *